(12) United States Patent
Krywitsky

(10) Patent No.: US 7,059,369 B2
(45) Date of Patent: Jun. 13, 2006

(54) SELF-CLEANING PRODUCT TRANSFER DEVICE

(75) Inventor: Lee A. Krywitsky, Calgary (CA)

(73) Assignee: Hiltap Fittings Ltd., Calgary ( * ) Notice: Subject to any disclaimer, the term of this patent is extended or adjusted under 35 U.S.C. 154(b) by 0 days.

(21) Appl. No.: 10/693,548

(22) Filed: Oct. 24, 2003

(65) Prior Publication Data

US 2005/0087259 A1   Apr. 28, 2005

(51) Int. Cl.
*B65B 1/04* (2006.01)

(52) U.S. Cl. .......... 141/362; 141/95; 141/258; 141/360; 141/374

(58) Field of Classification Search .......... 141/2, 141/18, 95, 98, 250, 258, 351, 360–362, 141/374

See application file for complete search history.

(56) References Cited

U.S. PATENT DOCUMENTS

| | | | | |
|---|---|---|---|---|
| 3,863,689 A | * | 2/1975 | Lanning et al. | 141/115 |
| 3,924,666 A | * | 12/1975 | Raison | 141/231 |
| 4,054,161 A | * | 10/1977 | Alack | 141/12 |
| 4,141,394 A | * | 2/1979 | Lassman et al. | 141/284 |
| 5,746,258 A | * | 5/1998 | Huck | 141/67 |
| 6,311,744 B1 | * | 11/2001 | Cary | 141/286 |

* cited by examiner

Primary Examiner—Timothy L. Maust
(74) Attorney, Agent, or Firm—Workman-Nydegger

(57) ABSTRACT

A product transfer device is provided that includes telescoping tubular arm sections that collectively define a fluid passageway and are arranged so that a terminal arm section has the smallest diameter, while the diameters of the succeeding arm sections are increasingly larger. Piston seals in adjacent arm sections cooperate to define a chamber. A product transfer valve and isolation valve control the flow of product through the product transfer device. Pressurization of the passageway extends the arm sections and an actuator device opens the product transfer valve when the transfer arm contacts a container bottom. Pressurization of the chamber causes retraction of the arm sections so that the exterior of each arm section is wiped clean by the piston seal of the arm section into which that arm section is retracted. Retraction of the arm sections also operates a securing device that automatically shuts the product transfer valve.

33 Claims, 8 Drawing Sheets

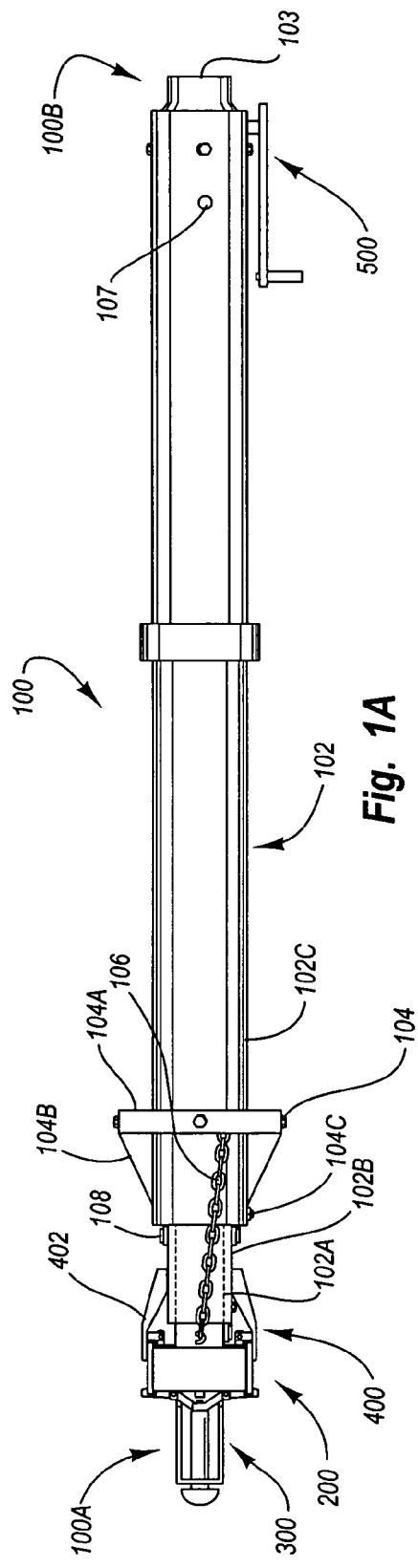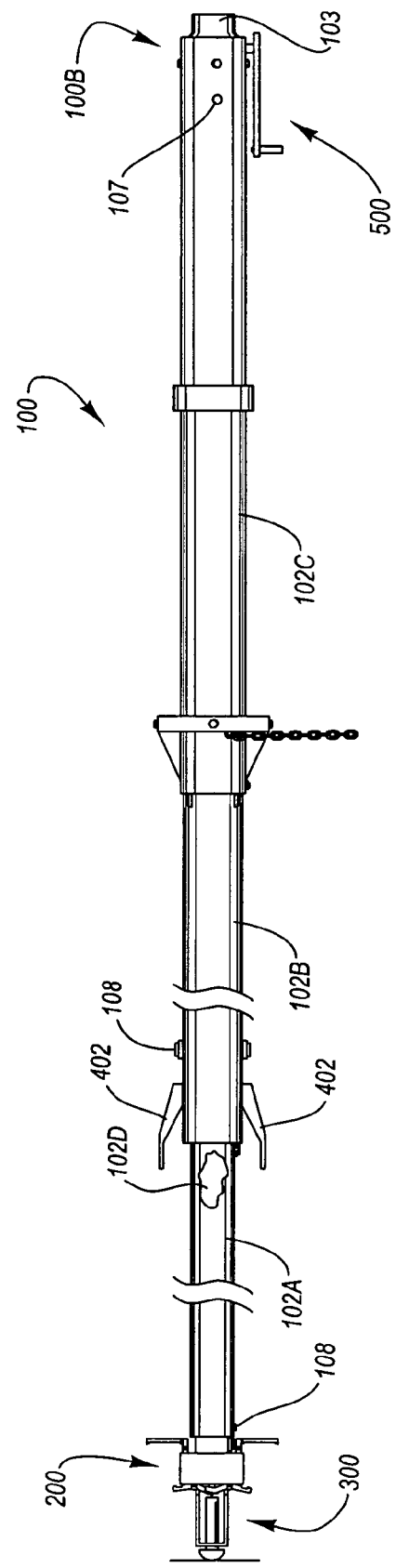

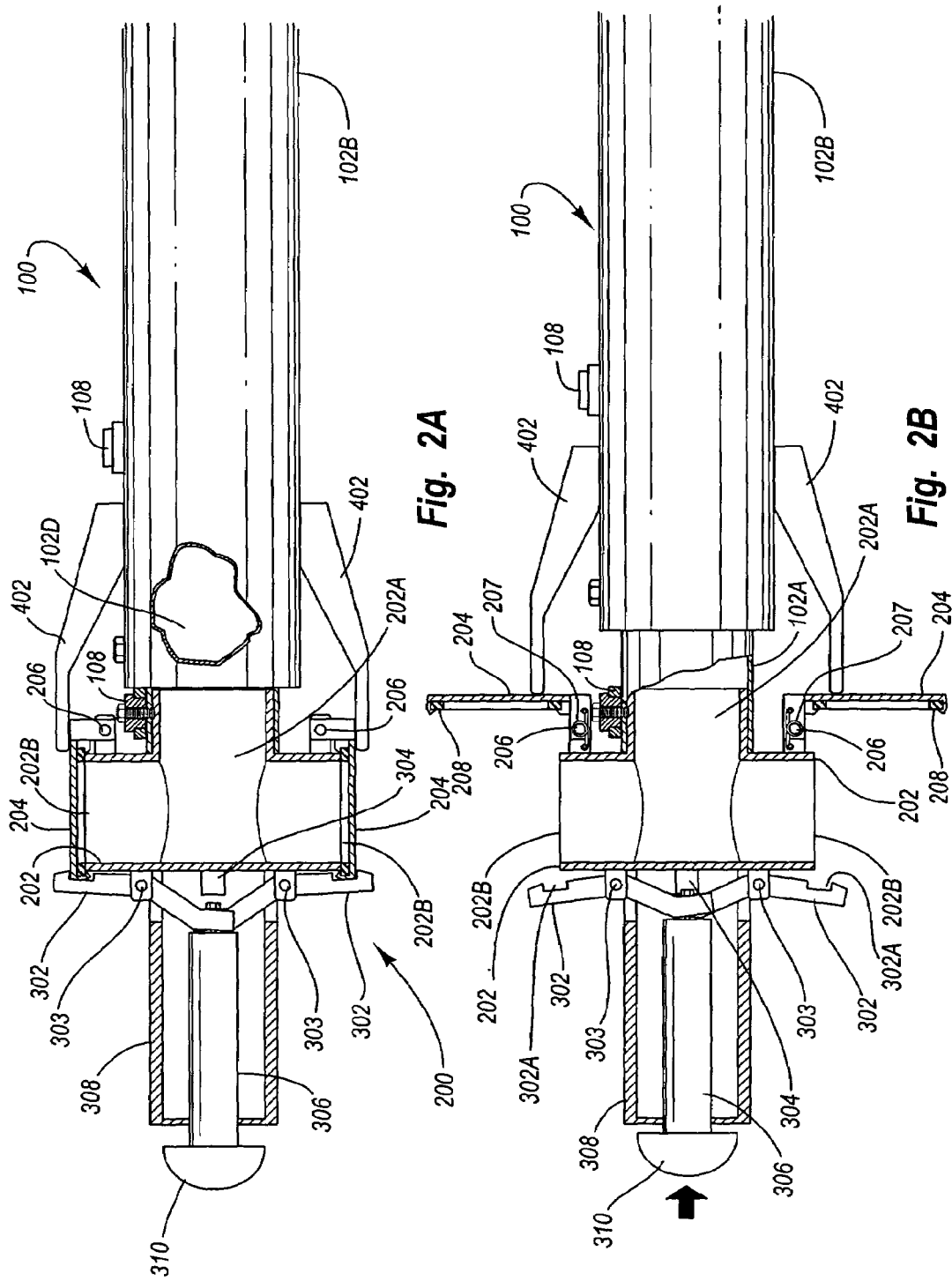

SELF-CLEANING PRODUCT TRANSFER DEVICE

RELATED APPLICATIONS

Not applicable.

BACKGROUND OF THE INVENTION

1. Field of the Invention

The present invention relates generally to product transfer systems. More particularly, embodiments of the present invention relate to product transfer systems and devices configured to effectively and efficiently manage product transfer operations and to minimize the escape of product after a product transfer operation has been completed.

2. Related Technology

Many industries and industrial processes require that liquid products such as chemicals, solvents and process intermediates, as well as various non-liquid particulate or pelletized materials, be transferred to, and/or between, containers such as railcars, road tankers, intermediate bulk containers, as well as containers located on ships and other vessels. Such containers are configured in a variety of different ways and may include one or more top, bottom and/or side loading openings configured and arranged to interface with a product transfer device so that product can be introduced into and/or removed, or educted, from the container by way of the product transfer device.

Typically, such product transfer devices comprise one or more hoses supported by a loading arm. A rigid tube disposed at a terminal end of the hose is configured to direct the flow of product to the container, or may be inserted into the opening of the container as necessary to remove product from the container.

However, the wide variety of containers that may be required to be filled or emptied makes the use of such devices problematic. In particular, it is often the case that considerable maneuvering of the loading arm, and hose, is necessary in order to properly position the hose and rigid tube relative to the container in preparation for a product transfer operation. Thus, the loading arms typically employed in connection with many product transfer devices are constructed in a mechanically complex fashion so that such loading arms are better able to meet a variety of operational conditions. Unfortunately, such complex construction makes the loading arms prone to operational and other problems that affect the reliability and utility of the loading arm.

A related problem concerns certain operational requirements of many loading arm assemblies. In particular, while containers that are involved in transfer operations, such as a rail car for example, may in some instances be precisely positioned, the configuration of the loading arm is such that a substantial amount of overhead space must be available so as to enable the hose and loading arm to be readily moved into, and out of, position relative to the container.

Yet other problems with many loading arms and related systems concern the relative lack of precision with which they can be maneuvered. Specifically, while such arms may be maneuvered to a variety of positions, it is often the case that considerable physical effort is required on the part of operating personnel in order to precisely position the arm and hose in preparation for a product transfer operation. As a result, harm to personnel and/or damage to property may occur as the hose and loading arm is moved into, and out of, position.

In addition to being relatively difficult to maneuver and position, many product transfer devices, such as loading arm and hose systems, are of limited effectiveness where product control is concerned. In this regard, the use of such product transfer devices generally involves positioning the hose and rigid tube near the opening of the container. The product is then deposited into the container, or educted from the container, as applicable, via the rigid tube.

Subsequent to the transfer operation, the rigid tube is retracted from the container and moved to a stored position. During the retraction and storage processes however, any spray or other residue present on the outside of the tube and/or hose often runs down the outside of the tank, vessel or other container. This problem is particularly acute where the tube and/or hose is relatively long. As a result of the presence of these materials on containers and other structures, operating personnel must take great care in order to avoid slipping and injuring themselves. Nonetheless, injuries often occur as a result of the presence of such slick conditions.

The presence of such spray and/or residue is problematic for other reasons as well. In particular, where hazardous materials are being transferred, the presence of these materials on the outside of the container can pose a hazard to operating personnel, as well as to the environment. In addition, any material remaining on the loading arm and/or hose after a transfer operation can damage the arm and hose, and may also contaminate other materials with which the hose and/or arm come into contact.

Moreover, the presence of product within the tube and hose, after the transfer process has been completed, is problematic as well. For example, some loading arm assemblies include hoses, tubes and other product transfer elements that are configured such that even after product transfer is completed, and the shutoff valve is closed, product remaining in the lower portion of the tube or hose is still able to escape and run onto the container and/or other structures as the tube is retracted and stored. As noted earlier herein, such an escape of the product presents a hazard both to operating personnel and to the environment.

In view of the foregoing, and other, problems in the art, what is needed is a product transfer device that includes features directed to minimizing the escape of product subsequent to completion of a product transfer operation. Additionally, the product transfer device should be relatively easy to position and operate.

BRIEF SUMMARY OF AN EXEMPLARY EMBODIMENT OF THE INVENTION

In general, embodiments of the invention are concerned with a product transfer device that is configured to effectively and efficiently remove product from and/or add product to, a container, and that includes features directed to minimizing the escape of product subsequent to completion of a product transfer operation.

In one exemplary embodiment of the invention, a product transfer device is provided that includes a transfer arm having a variable length and comprising a plurality of telescoping arm sections joined together to cooperatively define a passageway, the passageway having an upper end and a terminal end and being configured to be substantially leaktight when pressurized. One or more of the arm sections is configured to be at least partially received within, and extendible therefrom, a piston seal disposed in an adjacent arm section so that a substantial portion of the circumference of the received arm section is in contact with the piston seal disposed in the receiving arm section during extension and retraction of the received arm section. The received arm also includes a piston seal that is received within the receiving arm section. These piston seals cooperate to define a chamber that is substantially leaktight when pressurized.

The product transfer device also includes a product transfer valve disposed proximate the terminal end of the passageway and in communication with the passageway. The product transfer valve is configured for automatic opening by way of an actuator device, and is also configured to be automatically secured by a securing device. Finally, a shut-off valve is provided that is in communication with the passageway.

In operation, the passageway is made substantially airtight by securing the product transfer valve and shutoff valve. Pressurized fluid, such as air for example, is then admitted to the passageway, causing the telescoping arm sections to extend until a desired length of the transfer arm is achieved. When the actuator device contacts a surface, such as a tank bottom, the product transfer valve are automatically opened and the pressure inside the passageway is vented. Opening the shutoff valve causes product to flow, in this example, into the container.

After the product transfer process is completed, the telescoping arm sections are retracted by pressurizing the chamber(s) cooperatively defined by the piston seals and thereby causing a received arm section to be retracted into an adjacent receiving arm section. Because the tolerance between the piston seals and arm sections is relatively close, product present on the exterior of a received arm section is substantially cleaned off by the piston seal of the adjacent receiving arm section as the received arm section is retracted into the receiving arm section, so that the product thus removed runs into the container above which the product transfer device is positioned.

Not only does retraction of the arm sections enable a self-cleaning process, but retraction of the arm sections also moves the arm section adjacent the terminal arm section into operative contact with the securing device such that the product transfer valve is closed as a result of the retraction of the arm sections. Any product remaining in the fluid passageway is thus prevented from escaping.

These and other, aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1A is a side view illustrating various aspects of an exemplary implementation of a transfer arm, in a retracted position, of a product transfer device;

FIG. 1B is a side view illustrating various aspects of an exemplary implementation of a transfer arm, in an extended position, of a product transfer device;

FIG. 2A is a side view illustrating various aspects of an exemplary implementation of a product transfer valve, in an open position, as employed in connection with a transfer arm;

FIG. 2B is a side view illustrating various aspects of the product transfer valve depicted in FIG. 2A, where the product transfer valve is in a closed position;

DETAILED DESCRIPTION OF SELECTED EMBODIMENTS OF THE INVENTION

Figure 3A:
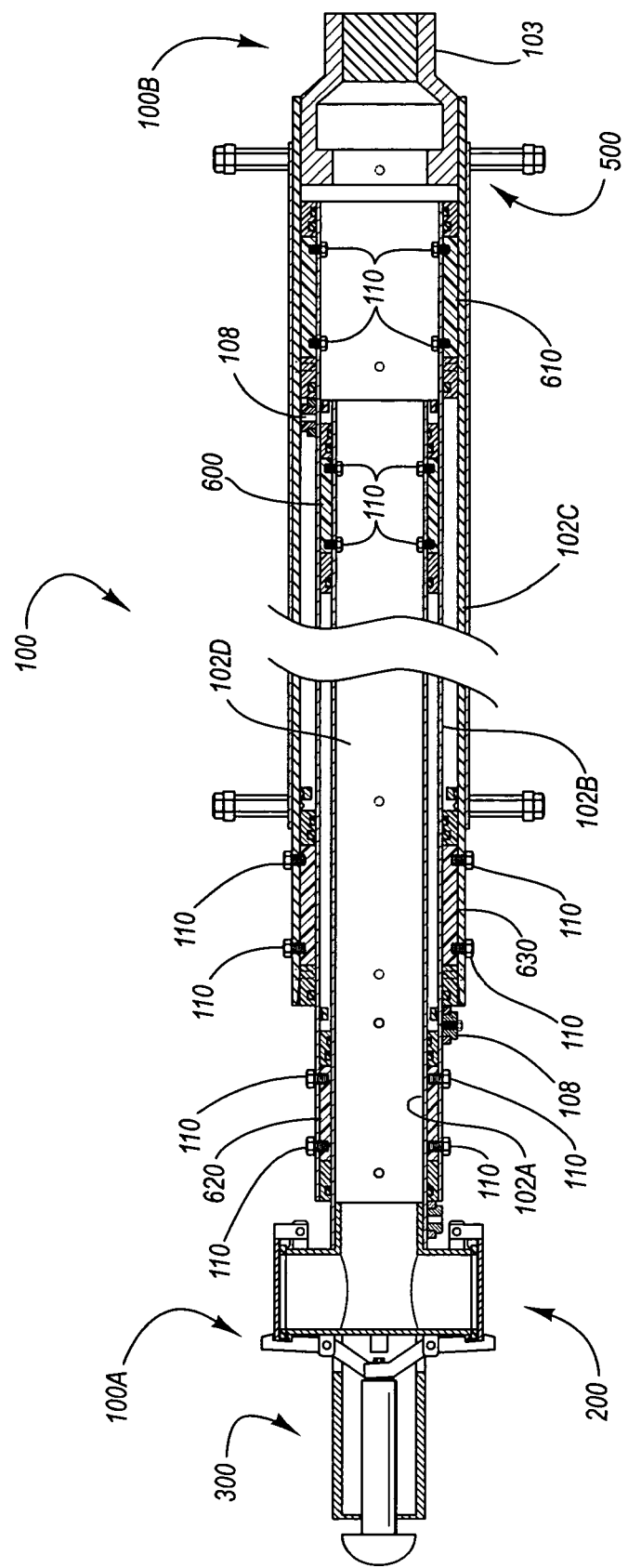
FIG. 3A is a cutaway view illustrating aspects of the arrangement of the piston elements depicted in FIG. 3, when the transfer arm is in a retracted position.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In general, embodiments of the invention are suitable for use in the transfer of various types of materials, or products, from or to containers such as railcars, road tankers, intermediate bulk containers, and tanks, as well as containers located on ships and other vessels. Such products may comprise, for example, gases, liquids, liquid/gas combinations, or any other type of material having characteristics that enable it to flow through the product transfer device. Examples of such other materials include, but are not limited to, powdered solids and granulated solids, sand, grain and various other particulate materials.

With attention first to FIGS. 1A and 1B, details are provided concerning various aspects of an exemplary implementation of a product transfer device, generally indicated at 100. In general, the product transfer device 100 includes a transfer arm 102 that comprises a plurality of arm sections 102A through 102n arranged in a telescoping configuration with respect to each other such that the overall length of the transfer arm 102 can be adjusted as desired. The arm sections cooperate with each other to collectively define a passageway 102D through which product can be directed. As discussed in further detail below, the passageway 102D thus defined can be made substantially leaktight in certain instances.

In the exemplary embodiment illustrated in FIGS. 1A and 1B, an arm section 102A is provided that is configured and arranged to be at least partially received within an adjacent arm section 102B that, in turn, is configured and arranged to be at least partially received within an adjacent arm section 102C. As collectively suggested by FIGS. 1A and 1B, the transfer arm 102 is configured such that its length can be varied by adjusting the extent to which a given arm section is received within, or extended from, an adjacent arm section. While the illustrated embodiment depicts a transfer arm 102 comprised of three arm sections, the scope of the invention is not so limited.

The particular arrangement depicted in FIG. 1A illustrates the transfer arm 102 in a substantially retracted position, while FIG. 1B illustrates the transfer arm 102 in a substantially extended position. Of course, an endless variety of intermediate positions, or arm lengths, may likewise be achieved through suitable adjustments to one or more of the arm sections that collectively comprise transfer arm 102. As discussed below, various other aspects of the transfer arm 102 may be varied or modified as necessary to suit the requirements of a particular application or operating environment, or for other reasons.

By way of example, aspects such as the number and length of the arm sections of the arm 102 may be varied. Moreover, the arm sections in a particular transfer arm 102 need not each be the same length. In similar fashion, the particular materials used in connection with the construction of arm sections 102A through 102C can be varied as well. Such exemplary materials include, but are not limited to, plastics and metals, and combinations thereof. Further, the geometry of arm sections 102A through 102C may be varied as necessary. For example, the arm sections may define cross-sections in shapes that include, but are not limited to, triangular, square or circular. Various other cross-sectional shapes may likewise be employed.

With continuing attention to FIGS. 1A and 1B, the product transfer device 100 generally defines a terminal end 100A and an upper end 100B that, exemplarily, terminates in a pipe fitting 103. The pipe fitting 103 may take various forms including, but not limited to, a welded, brazed or threaded connection, and may be configured in any suitable size. Proximate the terminal end 100A, a product transfer valve 200 is provided that communicates with the passageway 102D. In general, the product transfer valve 200 permits selective communication between the passageway 102D and the container in connection with which a product transfer operation is to be performed. As discussed in further detail below, aspects of the operation of the product transfer valve 200 are implemented through the use of an actuator device 300 and a securing device 400.

Disposed near the upper end 100B of the product transfer device 100 is a shutoff valve 500. Exemplarily, the shutoff valve 500 comprises a butterfly valve. However, any other type of valve or device that would provide the functionality disclosed herein may alternatively be employed. For example, a gate valve or ball valve may be employed as a shutoff valve 500. Thus configured and arranged, the product transfer valve 200 and shutoff valve 500 cooperatively enable passageway 102D to be closed off and made substantially leaktight.

The illustrated embodiment of the product transfer device 100 further includes a handle and guard assembly 104 attached, either permanently or removably, to the transfer arm 102. Among other things, the handle and guard assembly 104 enables an operator to move and position the transfer arm 102 in a desired fashion. In addition, the handle and guard assembly 104 also provides a measure of protection to the transfer arm 102 when the transfer arm 102 is retracted and moved to, or residing in, a stowed position, by preventing direct contact of the transfer arm 102 with adjacent structures that could damage the transfer arm 102.

In the illustrated embodiment, the handle and guard assembly 104 comprises a hoop 104A, constructed of metal flat bar or other suitable material, substantially disposed about the transfer arm 102 and attached thereto by way of a plurality of straps 104B and bolts 104C. As suggested in FIG. 1A, at least some of the bolts 104C also serve as standoffs that position the hoop 104A a predetermined distance away from the outside of the transfer arm 102.

Of course, some or all of the functionality implemented in connection with the handle and guard assembly 104 may be achieved in a variety of other ways as well. By way of example, one alternative implementation (illustrated in FIG. 3B) of the handle and guard assembly 104 comprises a plurality of bolts 105 received in holes tapped in the transfer arm 102.

As further suggested in FIGS. 1A and 1B, at least some embodiments of the product transfer device 100 include a restraint device 106. In the illustrated embodiment, the restraint device 106 comprises a length of chain attached to the handle and guard assembly 104 at one end and removably hooked, or otherwise removably attached, to the product transfer valve 200 at the other end. Among other things, the restraint device 106 prevents the terminal end 100A of the product transfer device 100 from inadvertently extending during transportation or movement of the transfer arm 102. The restraint device 106 may be implemented in a variety of other ways as well. For example, the restraint device 106 may alternatively be constructed from cable, wire or any other suitable material.

At least one of the arm sections includes a pressure port 107 configured to be connected with a pressure hose and associated pressure source. Exemplarily, the pressure port 107 is defined by arm section 102C. However, the pressure port 107 may be located elsewhere on the transfer arm 102. Finally, one or more of the arm sections includes a stop 108 that limits the extent to which an arm section can be retracted within another section. The stops 108 may be welded, bolted or otherwise attached to the arm section in any suitable manner.

With more particular attention now to FIG. 1B, further details are provided concerning an exemplary implementation of the product transfer device 100. As indicated in FIG. 1B, the arm section 102A to which the product transfer valve 200 is attached is substantially extended from adjacent arm section 102B. In similar fashion, arm section 102B is substantially extended from adjacent arm section 102C to which shutoff valve 500 is attached. As discussed in further detail below, one or more of the arm sections 102A, 102B and 102C cooperates with at least one adjacent arm section in such a way that the use of a pressurized fluid, such as air for example, can be used to extend one or more of the arm sections and thereby adjust the length of the transfer arm 102.

In addition, FIG. 1B indicates that when the transfer arm 102 of the product transfer device 100 is in the fully extended position, the product transfer valve 200 is configured so that communication is established between the passageway 102D collectively defined by the arm sections 102A through 102C and the surrounding environment. When the transfer arm is thus configured, and the shutoff valve 500 is open, product is free to flow through the passageway 102D and the product transfer valve 200 as necessary. More particular details concerning the construction and operation of the product transfer valve 200, as well as that of the actuator device 300 and securing device 400, are provided below in connection of the discussion of FIGS. 2A and 2B.

With attention now to FIGS. 2A and 2B, details are provided concerning the structure and operation of the product transfer valve 200 of the product transfer device 100. Directing attention first to FIG. 2A, the product transfer valve 200 includes a fitting 202 that, exemplarily, defines a T-shaped passageway 202A in communication with the passageway 102D collectively defined by the arm sections 102A, 102B and 102C of the transfer arm 102. Thus configured, the product transfer valve 200 permits product to be delivered from transfer arm 102 into the container through openings 202B. In similar fashion, product can be removed from a container through the openings 202B of the product transfer valve 200.

In one alternative implementation, the fitting 202 of the product transfer valve 200 is substantially in the form of a bend, such as a 90 degree elbow for example, where one opening of the elbow is attached to arm section 102A while the other opening of the elbow is arranged to deliver product to, or remove product from, a container such as a tank. When implemented in this fashion, fitting 202 provides a single opening for product delivery and/or removal, while the T-shaped configuration of fitting 202 provides for two openings for product delivery and/or removal. Other aspects of the fitting 202, such as the size and material may likewise be varied as necessary.

The foregoing are exemplary implementations of product transfer valve 200, and various other fitting configurations may alternatively be employed, as necessary to suit the requirements of a particular application. Accordingly, the scope of the invention should not be construed to be limited to any particular implementation of product transfer valve 200. More generally, any product transfer valve 200 effective in transferring product may be employed.

With continuing attention to FIG. 2A, flow through the fitting 202 of the product transfer valve 200 is controlled in part through the use of a pair of movable doors 204, one of which is disposed approximate either of the openings 202B and is biased toward an open position by a resilient element 207, which exemplarily comprises a spring. Each of the doors 204 is attached to the fitting 202 by way of a pin 206 which allows the door 204 to rotate between an open and closed position. A gasket 208 provided on each of the doors 204 insures a substantially leaktight fit between the door 204 and the fitting 202 and thereby substantially prevents product, or other materials, from escaping or entering fitting 202 when the door 204 is in the closed position. Such gaskets may comprise rubber, silicone, or any other suitable material.

It was noted earlier herein that the product transfer valve 200 is operable in connection with an actuator device 300. More particularly, the actuator device 300 exemplarily includes a pair of arms 302, each of which is attached to the fitting 202 by way of a pin 303 about which the arm 302 can rotate, and each arm 302 further defines a corresponding notch 302A configured to releasably engage the upper edge of a corresponding door 204. The arms 302 may, additionally, be joined to each other or, alternatively, may comprise discrete elements. In either case however, each of the arms 302 is configured to be operatively arranged with respect to a resilient element 304 attached to the top of fitting 202 so that the resilient element 304 biases the arms 302 into a desired position. In the illustrated embodiment, the bias imposed by the resilient element 304 causes the arms 302 to be positioned so as to retain doors 204 in the closed position, as suggested in FIG. 2A. The resilient element 304 may take any of a variety of forms including, but not limited to, a coiled spring, leaf spring, or clip.

As discussed in further detail below, the actuator device 300 also includes a transfer element 306 slidingly disposed in a sleeve 308 and terminating in a bumper 310 that exemplarily comprises a resilient material such as rubber or vinyl. The sleeve 308 is configured to allow limited linear motion of the transfer element 306 but also to prevent transfer element 306 from exiting sleeve 308 completely. As indicated in FIG. 2A, the transfer element 306 is arranged so that a terminal end, opposite the bumper 310, is disposed in close proximity to the ends of the arms 302 which contact the resilient element 304.

After such time as a product transfer process has been completed, the securing device 400 is used to return the doors 204 to the closed position. As indicated in FIG. 2A, the securing device 400 exemplarily comprises a pair of arms 402 fixed proximate the end of arm section 102B, such as by welding, brazing or other suitable process. The arms 402 are arranged so that when the transfer arm 102 is extended, the arms 402 are retracted away from the doors 204 and the doors 204 open under the influence of the bias imposed by their respective corresponding resilient elements 205. As the transfer arm 102 is retracted and arm section 102A is received by arm section 102B, the arms 402 positioned near the end of arm section 102B slide into contact with the doors 204, pushing the doors 204 into the closed position, where the doors 204 are then retained by the arms 302.

As suggested by the foregoing, the securing device 400 comprises one exemplary structural implementation of a means for automatically closing the product transfer valve 200. Any other structure(s) of comparable functionality may alternatively be employed however. In similar fashion, the actuator device 300 comprises one exemplary structural implementation of a means for automatically opening the product transfer valve 200. Similar to the case of the securing device 400, any other structure(s) of comparable functionality may alternatively be employed.

With more particular attention now to FIG. 2B, details are provided concerning aspects of the product transfer valve 200 when the doors 204 are in the open position. In particular, depression of the bumper 310, such as would occur when bumper 310 contacts the bottom of a tank or other container, causes a corresponding movement of the transfer element 306 toward the arms 302 such that the ends of arms 302 rotate upward and the slots 302A release the doors 204, which are then free to open so that communication is established between the passage 102D and passageway 202A, with the interior of the tank or other container.

In this way, the product transfer valve 200 can be opened automatically. Moreover, the bumper 310 insures that no damage is caused to the interior of the tank or other container when the transfer arm 102 is inserted therein. Further details concerning the operation of the product transfer valve 200 as it relates to the operation of the transfer arm 102 are provided below.

Figure 3B:
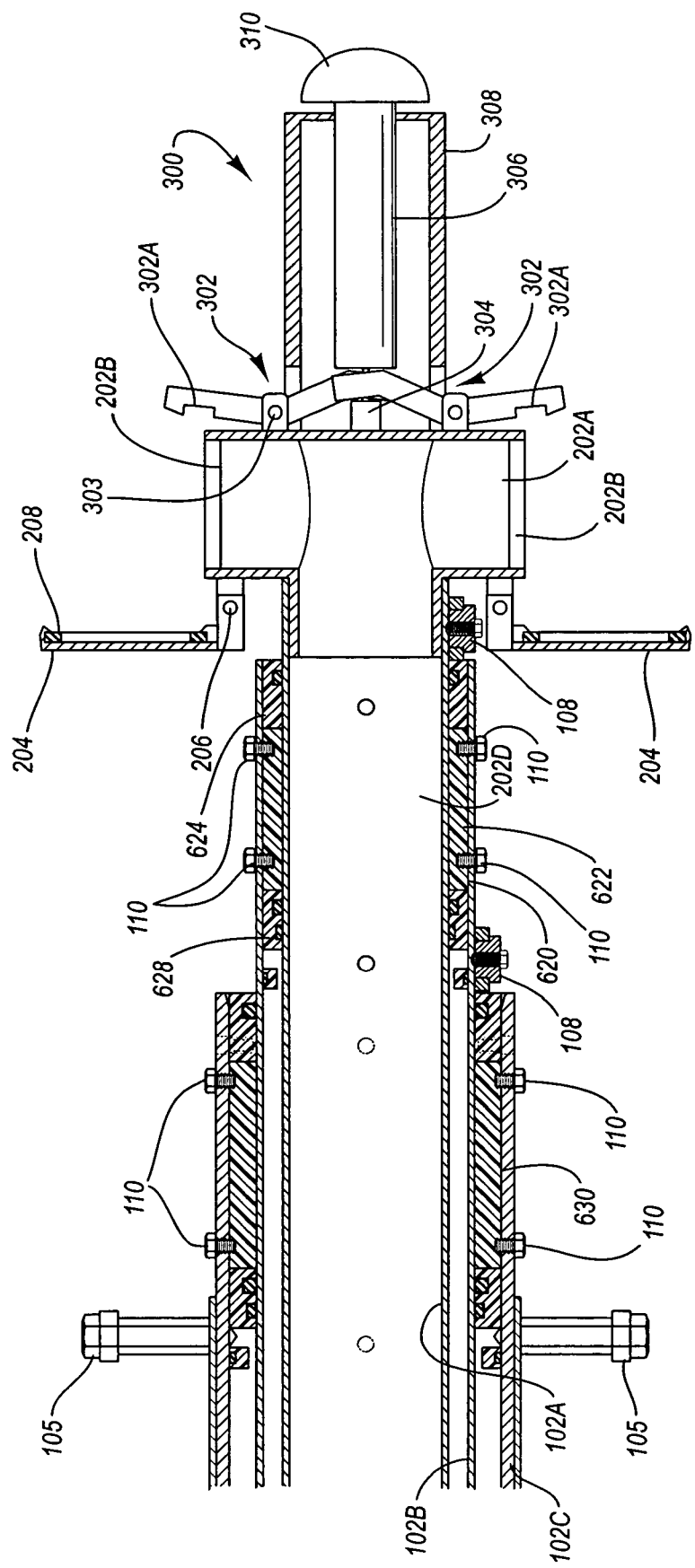
FIG. 3B is a cutaway view illustrating various details relating to the configuration of exemplary piston elements as employed in connection with the transfer arm, shown in the retracted position.
Figure 3C:
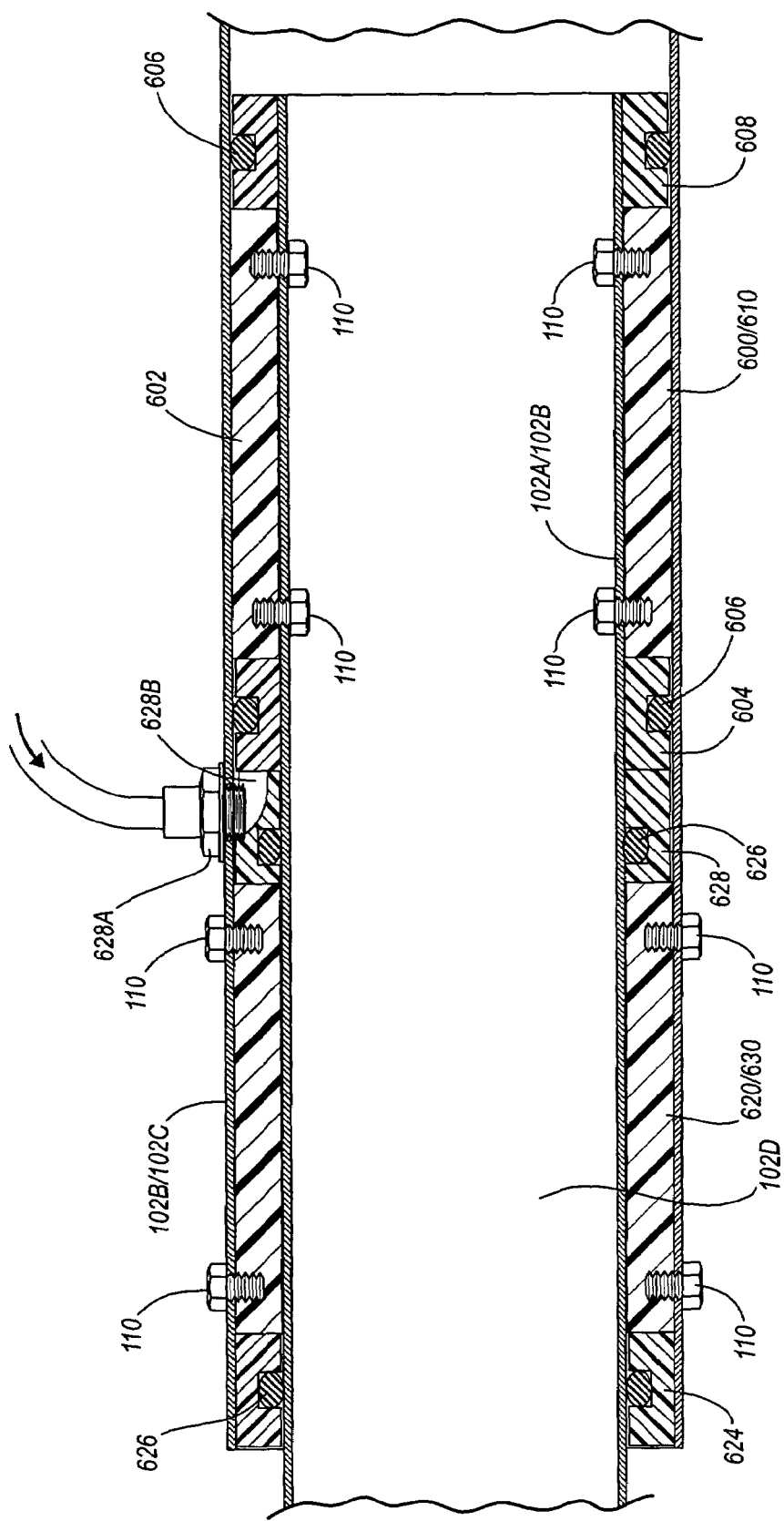
FIG. 3C is a cutaway view illustrating various details of the exemplary piston elements as they relate to operation of the transfer arm, shown in the extended position.

With attention now to FIGS. 3A through 3C, details are provided concerning further aspects of an exemplary implementation of the transfer arm 102. As generally indicated there, the relatively close fit achieved between the arm sections 102A and 102B, and between arm sections 102B and 102C, is achieved through an arrangement of piston seals that may be either permanently or removably attached to corresponding arm sections. More particularly, the first arm section 102A includes at least one piston seal 600 attached about the circumference of the arm section 102A. Similarly, the arm section 102B includes a piston seal 610 disposed about the arm section 102B at the end of arm section 102B that is received within arm section 102C. Additionally, the arm section 102B further includes a piston seal 620 disposed within the arm section 102B and configured such that a close fit is achieved between arm section 102A and the piston seal 620. Finally, the arm section 102C includes piston seal 630 disposed within the end of arm section 102C and configured such that a close fit is achieved between the piston seal 630 and the exterior surface of arm section 102B.

As collectively suggested by FIGS. 3A through 3C, the arrangement and relative positioning of the piston seals 600, 610, 620 and 630 varies depending upon the extent to which the transfer arm 102 is extended or retracted. For example, the piston seals 600, 610, 620 and 630 are arranged as indicated in FIGS. 3A and 3B when the transfer arm 102 is in the retracted position. When the transfer arm 102 is in the extended position, the piston seals 600, 610, 620 and 630 are generally arranged as indicated in FIG. 3C.

With further reference to FIG. 3C, it can be seen that in general, a piston seal, such as piston seal 600 for example, is disposed about the exterior of the portion of the particular arm section that is received within an adjacent arm section. Further, a piston seal, such as piston seal 620 for example, which receives a portion of an adjacent arm section is attached to the interior of the receiving arm section. As indicated in FIGS. 3B and 3C, the attachment of the piston seals 600, 610, 620 and 630 may be implemented through the use of fasteners 110, such as bolts.

In connection with the use of the piston seals, it should be noted that various alternative arrangements are employed in other embodiments. For example, alternative embodiments may employ a relatively greater number of piston seals. Further, the spacing and/or other aspects of the arrangement of the piston seals may be varied as necessary or desirable.

With further attention to FIGS. 3B and 3C, details are provided concerning an exemplary implementation of piston seal 620. It should be noted in this regard that the construction and arrangement of piston seals 610, 600 and 630 are similar in many regards to that of piston seal 620. However, one or more of the piston seals facilitate extension and retraction of the arm 102, while other piston seals, such as piston seal 620 discussed below, receive at least a portion of an adjacent arm section.

In the illustrated embodiment, the piston seal 620 comprises a rider band 622 exemplarily comprising a durable, low friction material, such as polytetrafluoroethylene ("PTFE"), sized so that the outside diameter of the rider band 622 is substantially the same as the inside diameter of the arm section within which the piston seal 620 is disposed. In similar fashion, the insider diameter of the rider band 622 is substantially the same as the diameter of the arm section that is received within the piston seal 620. Among other things, the low friction rider band 622 permits the arm sections to move relative to each other easily and without binding.

The piston seal 620 further comprises a lower seal member 624 configured to carry a sealing element 626, such an O-ring. An upper seal member 628 is further provided that is likewise attached to the rider band 622 and carries a sealing element 626. The seal members may be constructed of various materials including, but not limited to, ceramic, plastic, or metal.

In addition, the upper seal member 628 defines a port 628A configured to mate with a fitting or other connector of a transfer arm control system, such as that discussed below in connection with FIG. 4. In the embodiment illustrated in FIG. 3C, the port 628A is configured and arranged so that pressurized fluid admitted to the port 628A passes into a chamber 628B, discussed below, and exerts pressure on the lower seal member of the adjacent piston seal 600. In general, this configuration and arrangement enables movement of the arm section that is received in piston seal 620, and to which the adjacent piston seal 600 is attached.

As best illustrated in FIG. 3B, the chamber 628B communicates with port 628A and is cooperatively defined by, for example, the piston seal 600 and the piston seal 620, and is substantially annular in form, although any other configuration suitable for facilitating implementation of the functionality disclosed herein may be employed. The volume of chamber 628B gradually increases as pressure continues to be exerted through the port 628A and the piston seal 600 moves apart from the piston seal 620.

With continuing attention to FIGS. 3B and 3C, further details are provided concerning an exemplary implementation of a piston seal such as piston seal 600 or 610. In general, the configuration of the piston seal 610 is similar to the configuration of the piston seal 620. One difference between the two types of piston seals however, is that the piston seal 610 is attached to the exterior of an arm section by way of fasteners 110 passing through the wall of the arm section from the passageway 102D and into the rider band 602 of the piston seal 600. Similar to the piston seal 620, the piston seal 600 includes a lower seal member 604 having a sealing element 606 and further includes an upper seal member 608 that likewise carries a sealing element 606. Among other things, the sealing elements 606 serve to ensure that pressurized fluid admitted to chamber 628B by way of port 628A is usefully exerted on the piston seal 600.

Unlike the piston seal 620, however, the piston seal 600 does not define a port for the admission of pressure. This is because, as discussed above, the piston seal 620 does not move relative to the arm section within which the adjacent arm section is received. Instead, as noted earlier, the piston seal 600 is configured to move within the arm section within which it is received.

Figure 4:
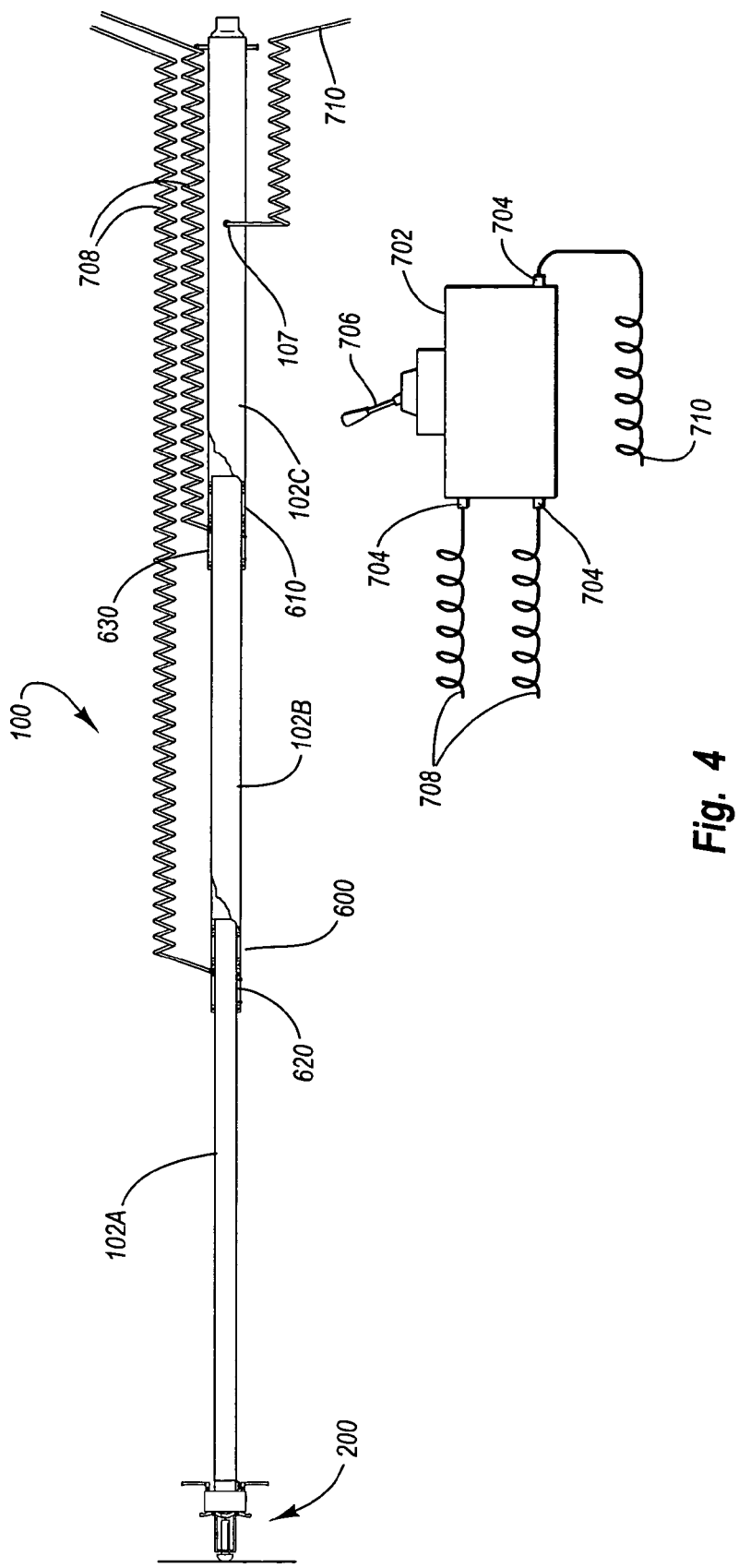
FIG. 4 is a schematic view of aspects of a transfer arm control system as employed in connection with piston elements of the transfer arm.

With attention now to FIG. 4, details are provided concerning an exemplary implementation of a transfer arm control system 700 such as may be used in connection with the adjustment of the length of the transfer arm 102. Exemplarily, the transfer arm control system 700 employs compressed air to implement its functionality. However, any other suitable fluid may be substituted. Examples include, but are not limited to, hydraulic fluid, water, and gases.

Generally, the transfer arm control system 700 includes a pressure source 702, such as a compressor or pump, configured for communication with various ports 704 through which pressure from the pressure source 702 can be transmitted. Additionally, the transfer arm control system 700 includes a control device 706 that is operably connected with components, such as solenoid valves so that pressure can be selectively transmitted through one or more of the ports 704. At least some embodiments of the transfer arm control system 700 further include components such as solenoid valves, that likewise permit the control device 706 to be used to bleed off some or all of the pressure that is present in the various control lines 708 and 710 that are connected to ports 704.

In the exemplary embodiment illustrated in FIG. 4, the control lines 708 are used to transmit pressure to ports, such as port 628A, for example, (FIG. 3B) so as to enable relative movement of the arm sections of the transfer arm 102 and, thus, adjustments to the length of the transfer arm 102. Additionally, the control line 710 is employed to pressurize passageway 102D when the product transfer valve 200 and shutoff valve 500 have been secured.

In general, the control lines 708 and 710 exemplary comprise a helically wound resilient conduit or hose made of rubber, plastic or similar material so that the control lines 708 and 710 can extend as necessary to accommodate extension of the arm sections, and to likewise enable the control lines 708 and 710 to be automatically retracted upon retraction of the various arm sections that make up the transfer arm 102.

In one alternative arrangement, the extension and retraction of the arm sections of the transfer arm 102, to which the control lines are attached, is accommodated through the use of a pulley arrangement that includes one or more resilient elements that serve to maintain a predetermined amount of tension of the control lines at all times. As suggested by the foregoing, the configuration, length and size of the various control lines 708 and 710 may be adjusted as necessary to suit the requirements of a particular application or transfer arm 102.

In yet another alternative embodiment, the arm sections of the transfer arm 102 are operably connected with one or more motors that enable adjustments to the length of the arm 102. The motors are, exemplarily, connected with one or more of the arm sections by way of a pulley and cable system.

With continuing attention to the Figures, details are now provided concerning various operational aspects of the exemplary illustrated implementation of the product transfer device 100. Initially, the various arm sections that make up the transfer arm 102 are in the substantially retracted position, as exemplified in FIG. 3A. At the same time, the doors 204 of the product transfer valve 200 are held in a closed position by the securing device 400. The shutoff valve 500 may or may not be closed.

The shutoff valve 500 is closed so that the passageway 102D can be pressurized. The controller 706 is then operated such that pressure is admitted through port 704 to control line 710 and then to passageway 102D through pressure port 107. The exertion of the pressure in the passageway 102 and on the fitting 202 of the product transfer valve 200 causes the arm sections 102A, 102B and 102C to extend into the arrangement generally indicated in FIG. 1B. Ultimately, the bumper 310 contacts the bottom of the tank or other container from which material is to be removed, or to which material is to be added, thereby causing the arms 302 to move into a position where the doors 204 are released. The opening of doors 204 cause the pressure to be vented from the passageway 102D. The shutoff valve 500 is then opened, and the transfer arm 102 is ready to deliver product to the container, or to remove product from the container.

At such time as the product transfer process has been completed, the shutoff valve 500 is closed and the controller 706 is operated such that pressure is exerted through control lines 708, thereby causing retraction of the arm sections 102A through 102C into the arrangement generally indicated in FIG. 3A. As discussed earlier, the pressure exerted by way of the control line 708 induces a corresponding movement of the arm sections to which a piston seal is attached. The stops 108 provided on each arm section serve as a limiter the range of motion of the arm sections under the influence of the pressure exerted through control lines 708 and 710. The stops exemplarily comprise a piece of structure welded or otherwise suitably attached to the arm sections. Alternatively, the stops 108 may be configured to be bolted to the arm sections, as indicated in the Figures. Any other arrangement providing the functionality disclosed herein may be employed however.

As arm section 102A nears the fully retracted position with respect to arm section 102B, arm section 102B comes into operational contact with the securing device 400, causing the retention elements to rotate into a position where the doors 204 of the product transfer valve 200 are retained in the closed position and, as discussed previously, the action of the resilient element 304 serves to insure that the arms 302 engage and retain the doors 204. Continued application of pressure to the piston seals results in full retraction of the transfer arm 102 to the retracted position.

As suggested by the foregoing, one aspect of exemplary embodiments of the invention is that the relatively close fit between adjoining arm sections that is afforded by the piston seals allows a piston seal to act in a manner similar to that of a scraper, or squeegee, to substantially remove any product that is present on the exterior surface of the received arm section as the received arm section is retracted into the receiving arm section.

Among other things, this self-cleaning aspect of the transfer arm 102 helps to prevent product from running onto the outside of the container or other nearby structures, thereby providing for a safer operating environment for product transfer personnel. This aspect of the transfer arm also helps to reduce or minimize harm to the environment that could otherwise result.

Similarly, the automatic closure feature of the product transfer valve 200 insures that any material or product still present in passageway 102D will be substantially prevented from escaping. In this way, the escape of product, and the various hazards that attend such escape, are minimized or eliminated.

As suggested elsewhere herein, aspects of the functionality of the product transfer valve, actuator device and/or securing device may be implemented in various ways. Moreover, embodiments of the actuator device and/or securing device may be implemented as discrete components separate from the product transfer valve, or may alternatively be implemented as subcomponents of a product transfer valve.

Figure 5A:
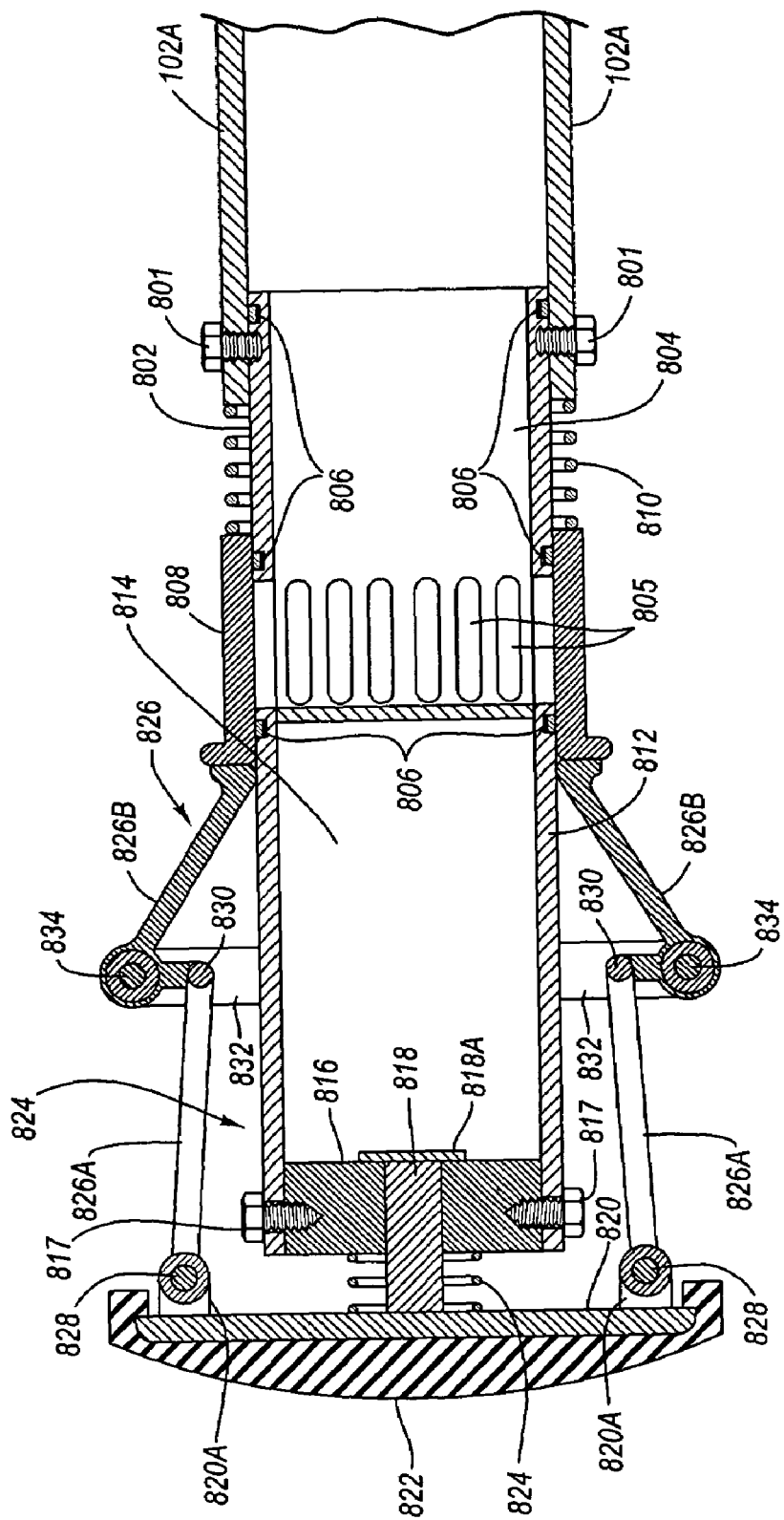
FIG. 5A is a section view illustrating aspects of an embodiment of a product transfer assembly in a first position where flow from the transfer arm is prevented.
Figure 5B:
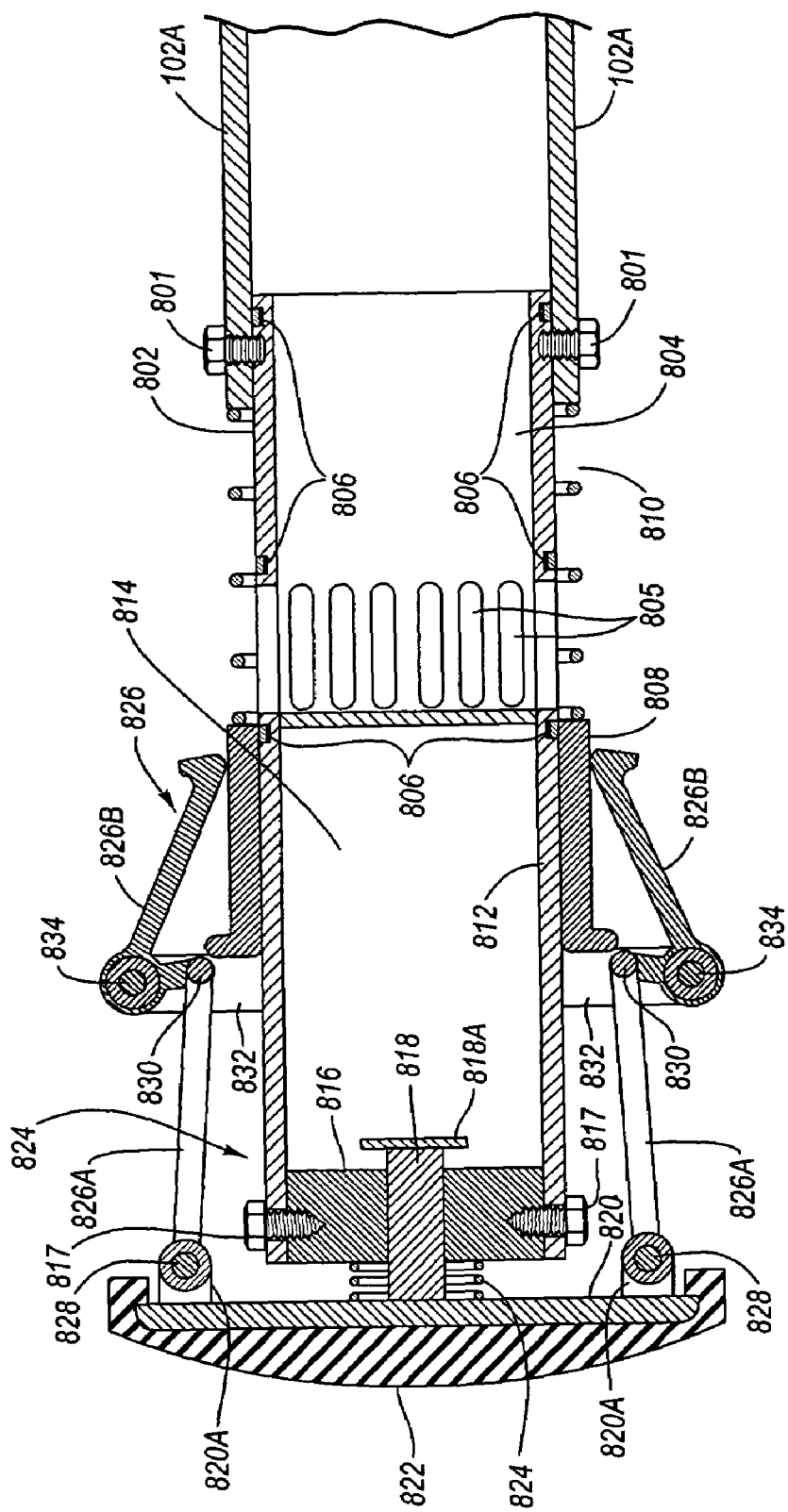
FIG. 5B is a section view illustrating aspects of an embodiment of a product transfer assembly in a second position where flow from the transfer arm is enabled.

Directing attention now to FIGS. 5A and 5B, details are provided concerning an exemplary embodiment of a transfer valve assembly, generally designated at 800. As indicated there, the transfer valve assembly 800 is exemplarily configured to be attached to arm section 102A (see, e.g., FIGS. 1A and 1B) by a plurality of bolts 801. Any other suitable attachment method may alternatively be employed however. Generally, the various components of the transfer valve assembly 800 are constructed of any of a variety of metals such as, but not limited to, brass and stainless steel. Any other suitable materials may be employed however.

The illustrated embodiment of the transfer valve assembly 800 includes an outlet section 802, exemplarily implemented as a section of metal pipe or tube, that defines a fluid passageway 804 arranged for fluid communication with the passageway 102D defined, for example, by arm section 102A. A plurality of ports 805 are defined in the outlet section 102 and are configured to enable fluid communication between the fluid passageway 804 and the atmosphere, or other environment, in certain conditions. The number, geometry, orientation, and arrangement of the ports 805 may be varied as necessary to suit the requirements of a particular application. Disposed about the circumference of the outlet section 802 are three pairs of sealing members 806, such as O-rings, that exemplarily comprise a perfluoroelastomer and generally serve to control or prevent, as applicable, fluid communication between the fluid passageway 804 and the atmosphere.

The transfer valve assembly 800 further includes a sleeve 808 configured and arranged for sliding reciprocal motion along outlet section 802 and end pipe 812 (discussed below).

Additionally, a resilient element 810, such as a spring, is disposed about the outlet section 802 and is configured and arranged to bias the sleeve 808. The resilient element 810 also cooperates with arm section 102A to facilitate definition of a range of reciprocal motion of the sleeve 808. Further details concerning the relation of the resilient element 810 and sleeve 808 are provided below.

With continuing reference to FIGS. 5A and 5B, the transfer valve assembly 800 also includes an end pipe 812 that is attached to the outlet section 802, such as by welding or other suitable process, and defines a substantially enclosed chamber 814. A shaft guide 816 fitted in the chamber 814 proximate the terminal portion of the end pipe 812, and secured in position by bolts 817, enables reciprocal motion of a supported shaft 818 between the positions indicated in FIGS. 5A and 5B, respectively.

The shaft 818 includes a top portion 818A that is wider than the opening defined by the shaft guide 816, so as to prevent complete withdrawal of the shaft 818 from the shaft guide 816. The other end of the shaft 818 is attached to a bumper body 820 that carries an associated bumper 822, exemplarily comprising polytetrafluoroethylene ("PTFE"), rubber, or other suitable material. In addition, a resilient element 824, such as a spring, is disposed about the shaft 818 so as to be interposed between the shaft guide 816 and attached to the bumper body 820. As best illustrated in FIG. 5B, the resilient element 824 biases the bumper body 820 toward the shaft guide 816.

With the continuing reference to FIGS. 5A and 5B, the illustrated embodiment of the transfer valve assembly 800 further includes three pairs of articulated arms 826, two pairs of which are visible in FIGS. 5A and 5B. Of course, more or fewer pairs of articulated arms 826 may be alternatively be employed. Further, any other structures or combinations thereof of comparable functionality may likewise be employed. In the illustrated embodiment, an articulated arm pair 826, comprising arms 826A and 826B, is attached at arm 826A to a corresponding post 820A of the bumper body 820 by way of a pin 828. In addition, the arm 826A is attached to the arm 826B by way of a pin 830. The arm 826B, in turn, is pinned to a post 832, attached to the end pipe 812, by way of a pin 834.

As indicated in FIGS. 5A and 5B, the configuration and arrangement of the arms 826A and 826B is such that a first position of the bumper body 820 (see FIG. 5A) corresponds to an arrangement where the arms 826B are positioned to cooperate with the resilient element 810 and arm section 102A to substantially prevent motion of the sleeve 808, thereby retaining sleeve 808 in position over the ports 805 so as to prevent fluid communication between fluid passageway 804 and the atmosphere, or other environment. A second position of the bumper body 820 (see FIG. 5B) corresponds to an arrangement where the arms 826B have rotated outwardly from the end pipe 812 so that the resilient element 810 is able to move sleeve 808 to a position where the ports 805 of the outlet section 802 are unblocked so that fluid communication is established between the fluid passageway 804 and the atmosphere, or other environment.

With continuing reference to FIGS. 5A and 5B, more specific details will now be provided concerning the operation of the exemplary implementation of the transfer valve assembly 800. In operation, the arm sections of the transfer arm, including arm section 102A (see, e.g., FIGS. 1A and 1B), are extended generally as described elsewhere herein. As the transfer arm is inserted into the vessel or other container in connection with which the product transfer process is to be implemented, the transfer arm is moved into a position where the bumper 822 contacts a structure, such as a tank bottom or wall for example. The motion of the transfer arm is continued until such time as the resilient element 824 is substantially compressed, as generally indicated in FIG. 5B.

As the resilient element 824 is compressed in this way, the arms 826A move upward, thereby rotating arms 826B away from the wall of the end pipe 812. As a result, the resilient member 810 acts freely upon sleeve 808 so as to bias sleeve 808 into a position where the ports 805 are partially or fully uncovered, thereby enabling fluid communication between the fluid passageway 804 and the tank, or other container, such that product can be transferred into or out of the container, as applicable. In this way, the transfer valve assembly 800 enables a product transfer operation while requiring only minimal human involvement to establish fluid communication between the transfer arm and tank.

Upon completion of the product transfer operation, the telescoping arm sections 102 (see, e.g., FIGS. 1A and 1B) of the transfer arm are retracted generally as disclosed elsewhere herein. As the bumper 822 is moved away from the structure upon which it had been positioned, the resilient element 824 acts to bias the bumper 822 into the position indicated in FIG. 5B. At some point after the transfer arm retraction process has begun, a human operator then moves the sleeve 808, against the bias imposed by the resilient element 810, back into the position indicated in FIG. 5A. At this point, the transfer arm is ready for initiation of another product transfer process.

The disclosed embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A product transfer device for use in enabling an operator to perform a product transfer operation in connection with a container, comprising:
    a transfer arm having a variable length and comprising at least first and second arm sections joined together to cooperatively define a passageway, the first arm section being at least partially received within the second arm section;
    a first piston seal attached to the first arm section;
    a second piston seal attached to the second arm section and cooperating with the first piston seal to define a chamber, the second piston seal defining a port in communication with the chamber;
    a product transfer valve in communication with the passageway,
    means for automatically opening the product transfer valve;
    means for automatically closing the product transfer valve; and
    a shutoff valve in communication with the passageway.

2. The product transfer device as recited in claim 1, wherein the passageway is substantially leaktight when the product transfer valve and shutoff valve are closed.

3. The product transfer device as recited in claim 1, wherein a portion of the first arm section is in substantial circumferential contact with the second piston seal.

4. The product transfer device as recited in claim 1, wherein a portion of the first piston seal is in substantial circumferential contact with the second arm section.

5. The product transfer device as recited in claim 1, wherein the first piston seal is attached outside of the first arm section, and the second piston seal is attached inside the second arm section.

6. The product transfer device as recited in claim 1, wherein the port defined by the second seal is configured to be attached to a pressure source.

7. The product transfer device as recited in claim 1, wherein the first piston seal is configured and arranged for movement relative to the second piston seal.

8. The product transfer device as recited in claim 1, wherein the chamber has a volume that is variable.

9. The product transfer device as recited in claim 1, wherein the chamber is substantially leaktight when pressurized.

10. The product transfer device as recited in claim 1, wherein the means for automatically opening the product transfer valve causes the product transfer valve to open upon a predetermined extension of the transfer arm.

11. The product transfer device as recited in claim 1, wherein the means for automatically opening to product transfer valve causes the product transfer valve to close upon a predetermined retraction of the transfer arm.

12. The product transfer device as recited in claim 1, wherein the means for automatically opening the product transfer valve comprises an actuator device operably disposed with respect to the product transfer valve.

13. The product transfer device as recited in claim 1, wherein the means for automatically closing the product transfer valve comprises a securing device operably disposed with respect to the product transfer valve.

14. A product transfer device for use in enabling an operator to perform a product transfer operation in connection with a container, comprising:
 a transfer arm having a variable length and comprising at least first and second arm sections joined together to cooperatively define a passageway, the first arm section being at least partially received within the second arm section;
 a first piston seal attached to the first arm section;
 a second piston seal attached to the second arm section and cooperating with the first piston seal to define a chamber, the second piston seal defining a port in communication with the chamber;
 a transfer valve assembly attached to the first arm section and comprising:
  a body defining a fluid passageway in communication with the passageway defined by the transfer arm, and the body further defining at least one port;
  a sleeve slidingly disposed about the body and configured to selectively block the at least one port;
  a resilient element disposed proximate the sleeve and arranged to bias the sleeve toward a predetermined position with respect to the at least one port;
  a bumper operably connected to pairs of articulated anus and being arranged for reciprocal motion relative to the at least one port, the pairs of articulated arms being configured and ranged to control motion of the sleeve based upon the position of the bumper.

15. The product transfer device as recited in claim 14, wherein when the bumper is in a first position, the sets of articulated arms retain the sleeve in position over the at least one port so tat the at least one port is substantially blocked by the sleeve, and wherein when the bumper is in a second position, the sets of articulated arms are positioned such that the resilient element is able to move the sleeve into a position where at least a portion of the at least one port is unblocked.

16. The product transfer device as recited in claim 15, further comprising a resilient element positioned to bias the bumper into the first position.

17. The product transfer device as recited in claim 14, wherein a portion of the first arm section is in substantial circumferential contact with the second piston seal.

18. The product transfer device as recited in claim 14, wherein a portion of the first piston seal is in substantial circumferential contact with the second arm section.

19. The product transfer device as recited in claim 14, wherein the first piston seal is attached outside of the first arm section, and the second piston seal is attached inside the second arm section.

20. The product transfer device as recited in claim 14, wherein the port defined by the second seal is configured to be attached to a pressure source.

21. The product transfer device as recited in claim 14, wherein the first piston seal is configured and arranged for movement relative to the second piston seal.

22. The product transfer device as recited in claim 14, wherein the chamber has a volume that is variable.

23. The product transfer device as recited in claim 14, wherein the chamber is substantially leaktight when pressurized.

24. The product transfer device as recited in claim 14, further comprising a shutoff valve in communication with the passageway, the passageway being substantially leaktight when the bumper of the transfer valve assembly is in the first position, and the shutoff valve is closed.

25. A product transfer device for use in enabling an operator 10 perform a product transfer operation in connection with a container, comprising:
 at least first and second arm sections, each of which defines an exterior surface, the arm sections being arranged so as to cooperatively define a passageway of variable length having an upper end and a terminal end and configured for communication with a first pressure source, the passageway being substantially leaktight when pressurized the first and second arm sections cooperating with each other to define a chamber configured for communication with a second pressure source, the first arm section being configured to be at least partially received within the second arm section;
 a first piston seal disposed about the first arm section so as to be at least partially received within the second arm section;
 a second piston seal disposed within the second arm section so as to at least partially receive the first arm section, the second piston seal cooperating with the first piston seal to define a chamber that is substantially leaktight when pressurized, the second piston seal defining a port in communication with the chamber;
 a product transfer valve in communication with the passageway;
 an actuator device operably disposed with respect to the product transfer valve;
 a securing device operably disposed with respect to the product transfer valve; and
 a shutoff valve in communication with the passageway.

26. The product transfer device as recited in claim 25, wherein each of the piston seals comprises:
 a rider band having first and second ends;
 an upper seal member attached to the first end of the rider band;

a lower seal member attached to the second end of the rider band;

at least one sealing element interposed between the upper seal member and an arm section; and at least one sealing element interposed between the lower seal member and an arm section.

27. The product transfer device as recited in claim 25, wherein the product transfer valve comprises:

a fitting attached to the transfer arm and defining a passageway in communication with the passageway of the transfer arm and that defines an opening;

a door attached to the fitting and configured to selectively close off the opening defined by the fitting, the door being operatively disposed with respect to the actuator device and the securing device.

28. The product transfer device as recited in claim 25, wherein the actuator device comprises:

a resilient element mounted to the fitting;

at least one arm, the arm being rotatably mounted to the fitting and disposed proximate the resilient element;

a transfer element disposed proximate the arm; and a bumper attached to the transfer element.

29. A product transfer system for use in enabling an operator to perform a product transfer operation in connection with a container, comprising:

a product transfer device, comprising:

a transfer arm having a variable length and comprising at least first and second arm sections joined together to cooperatively define a passageway, the first arm section being at least partially received within the second arm section;

a first piston seal attached to the first arm section;

a second piston seal attached to the second arm section and cooperating with the first piston seal define a chamber, the second piston seal defining a port in communication with the chamber;

a transfer valve assembly attached to the first arm section; and a shutoff valve in communication with the passageway; and a pressure source configured for selective communication with at least one of: the port; and, the passageway.

30. The product transfer system as recited in claim 29, wherein a portion of the first arm section is in substantial circumferential contact with the second piston seal.

31. The product transfer system as recited in claim 29, wherein a portion of the first piston seal is in substantial circumferential contact with the second arm section.

32. The product transfer system as recited in claim 29, wherein the first piston seal is attached outside the first arm section and is configured to be received within the second arm section.

33. The product transfer system as recited in claim 29, wherein the second piston seal is attached inside the second arm section and is configured to receive a portion of the first arm section.

* * * * *

UNITED STATES PATENT AND TRADEMARK OFFICE
CERTIFICATE OF CORRECTION

| | | |
|---|---|---|
| PATENT NO. | : 7,059,369 B2 | Page 1 of 3 |
| APPLICATION NO. | : 10/693548 | |
| DATED | : June 13, 2006 | |
| INVENTOR(S) | : Krywitsky | |

It is certified that error appears in the above-identified patent and that said Letters Patent is hereby corrected as shown below:

Title Page
Item 73, Assignee, after "Calgary" insert --(CA)--
Item 74, Attorney, Agent, or Firm, change "Workman-Nydegger" to --Workman Nydegger--

Drawings,
Sheet 2, replace Figure 2A with the figure depicted herein below, in which the "securing device" has been labeled with --400--

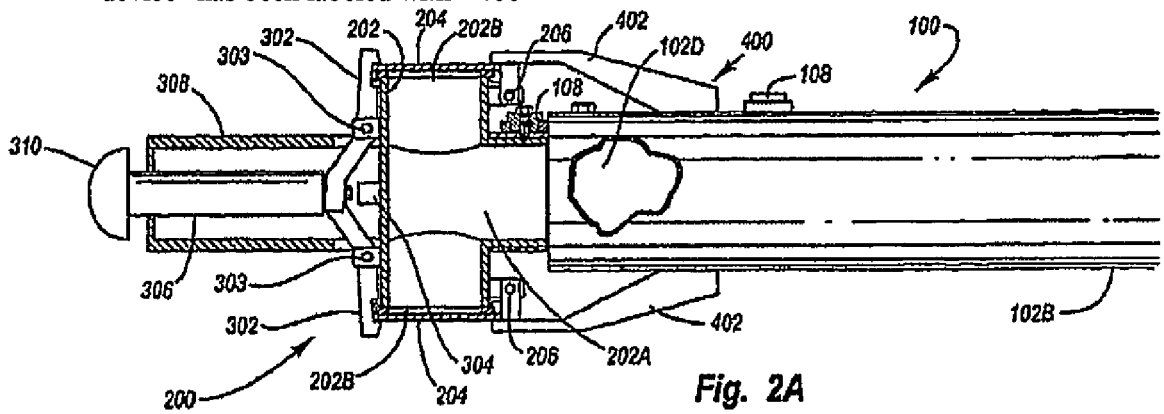

Sheet 2, replace Figure 2B with the figure depicted herein below, in which the "securing device" has been labeled with --400--

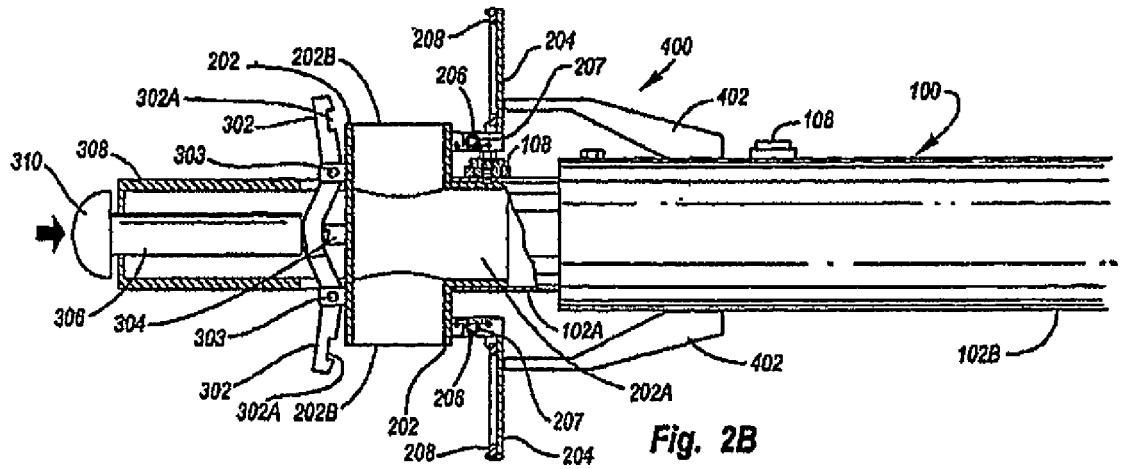

UNITED STATES PATENT AND TRADEMARK OFFICE
CERTIFICATE OF CORRECTION

PATENT NO.        : 7,059,369 B2                             Page 2 of 3
APPLICATION NO.  : 10/693548
DATED             : June 13, 2006
INVENTOR(S)       : Krywitsky It is certified that error appears in the above-identified patent and that said Letters Patent is hereby corrected as shown below:

Drawings
Sheet 7, replace Figure 5A with the figure depicted herein below, in which the "transfer valve assembly" has been labeled with --800--

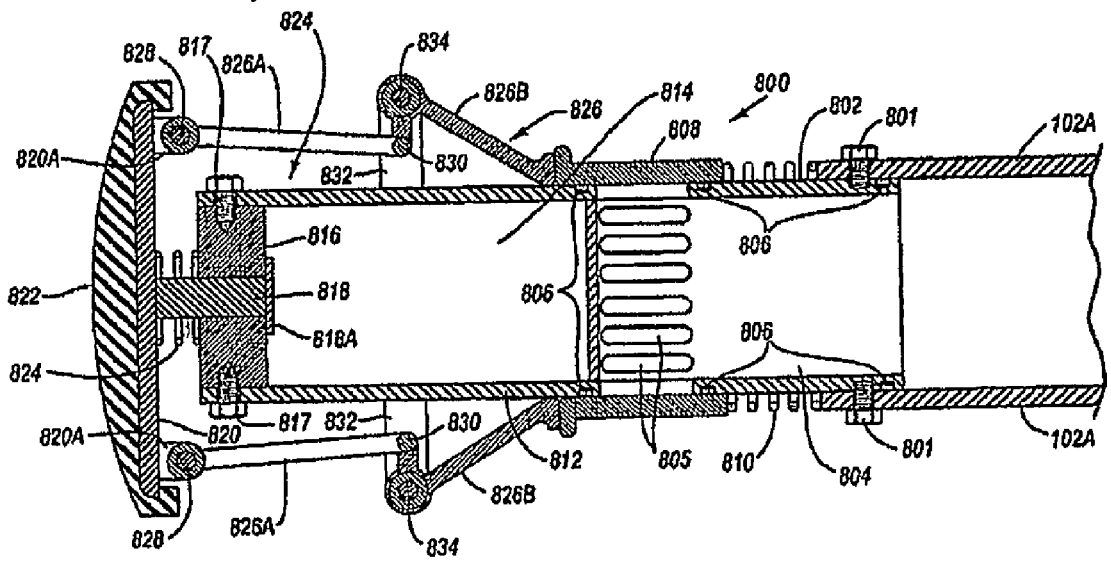
Fig. 5A

Sheet 8, replace Figure 5B with the figure depicted herein below, in which the "transfer valve assembly" has been labeled with --800--

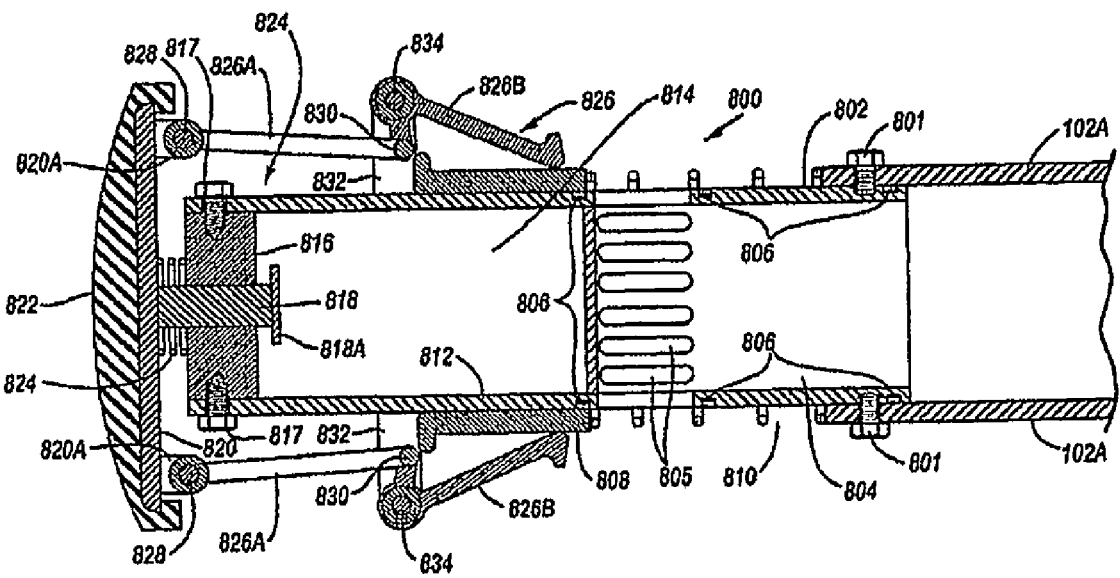
Fig. 5B

UNITED STATES PATENT AND TRADEMARK OFFICE
CERTIFICATE OF CORRECTION

PATENT NO. : 7,059,369 B2
APPLICATION NO. : 10/693548
DATED : June 13, 2006
INVENTOR(S) : Krywitsky It is certified that error appears in the above-identified patent and that said Letters Patent is hereby corrected as shown below:

Column 3
Line 20, change "are" to --is--

Column 4
Line 9, change "FIG. 3" to --FIG. 1--

Column 8
Line 19, change "205" to --207--

Column 10
Line 4, change "3B" to --3C--
Line 60, change "3B" to --3C--

Column 11
Line 15, change "or" to --of--
Line 36, change "102" to --102D--

Column 15
Line 58, change "anus" to --arms--
Line 65, change "tat" to --that--

Column 16
Line 34, change "10" to --to--

Column 18
Line 3, after "piston seal" insert --to--

Signed and Sealed this

Twenty-fourth Day of July, 2007

JON W. DUDAS
*Director of the United States Patent and Trademark Office*